United States Patent [19]
Lindsay

[11] Patent Number: 5,059,375
[45] Date of Patent: Oct. 22, 1991

[54] APPARATUS AND METHOD FOR PRODUCING KINK RESISTANT TUBING

[75] Inventor: Erin J. Lindsay, Manchester, Mich.

[73] Assignee: Minnesota Mining & Manufacturing Company, St. Paul, Minn.

[21] Appl. No.: 435,558

[22] Filed: Nov. 13, 1989

[51] Int. Cl.[5] .......................................... B29C 47/24
[52] U.S. Cl. .................................. 264/167; 264/173; 264/209.2; 264/312; 425/132; 425/133.1; 425/381; 425/382.3
[58] Field of Search ................. 264/173, 209.2, 40.7, 264/167, 312, 172; 425/131.1, 132, 133.1, 382.3, 113, 381, 516

[56] References Cited

U.S. PATENT DOCUMENTS

| | | | |
|---|---|---|---|
| 2,516,864 | 8/1950 | Gilmore et al. | 154/8 |
| 2,688,343 | 9/1954 | Cuddeback | 138/56 |
| 2,707,017 | 4/1955 | Beare et al. | 154/8 |
| 3,230,972 | 1/1966 | Davis, Jr. | 137/604 |
| 3,240,645 | 3/1966 | Friedwald et al. | 156/195 |
| 3,416,982 | 12/1968 | Petzetakis | 425/133.1 |
| 3,426,744 | 2/1969 | Ball | 128/1 |
| 3,461,197 | 8/1969 | Lemelson | 264/172 |
| 3,473,986 | 10/1969 | Hureau | 264/167 |
| 3,498,286 | 3/1970 | Polanyi et al. | 128/2 |
| 3,520,966 | 7/1970 | Soffiantini | 425/113 |
| 3,574,810 | 4/1971 | Tournery et al. | 425/113 |
| 3,605,189 | 9/1971 | Bauman et al. | 425/113 |
| 3,618,613 | 11/1971 | Schulte | 128/348 |
| 3,664,790 | 5/1972 | Hollander | 425/131 |
| 3,706,624 | 12/1972 | Rinker | 156/432 |
| 3,724,985 | 4/1973 | Burlis et al. | 425/132 |
| 3,919,026 | 11/1975 | Mizutani | 156/143 |
| 3,933,960 | 1/1976 | Cameron et al. | 264/209.2 |
| 3,997,382 | 12/1976 | Tanaka | 156/167 |
| 4,120,628 | 10/1978 | Simos | 425/381 |
| 4,302,261 | 11/1981 | Simkins | 156/64 |
| 4,302,409 | 11/1981 | Miller et al. | 264/45.9 |
| 4,350,547 | 9/1982 | Kanao | 156/143 |
| 4,370,186 | 1/1983 | Blandin et al | 156/203 |
| 4,459,168 | 7/1984 | Anselm | 156/143 |
| 4,479,835 | 10/1984 | Kutnyak et al. | 156/143 |
| 4,876,052 | 10/1989 | Yamada et al. | 264/172 |
| 4,888,146 | 12/1989 | Dandeneau | 425/132 |

FOREIGN PATENT DOCUMENTS 4317816 8/1963 Japan ..................................... 264/167

Primary Examiner—Jeffery Thurlow
Attorney, Agent, or Firm—Gary L. Griswold; Walter N. Kirn; Stephen W. Bauer

[57] ABSTRACT

Apparatus for producing flexible kink resistant tubing having one or more non-reinforced section(s) and one or more spirally-reinforced section(s). The apparatus includes a rotatable member having an extrusion passageway for extruding a second thermoplastic material in a filament within a first thermoplastic material to form a reinforcing filament in tubing formed by the first thermoplastic material. The rotatable member is rotated at a predetermined velocity to form the reinforcing filament in a spiral or helical pattern in the wall of the tubing. A diverter valve is provided for selectively providing the second thermoplastic material so that filament reinforced and non-reinforced longitudinal sections of tubing may be formed without interruption. A method of producing such kink resistant tubing is also disclosed.

27 Claims, 4 Drawing Sheets

APPARATUS AND METHOD FOR PRODUCING KINK RESISTANT TUBING

The invention relates to apparatus and a method for producing flexible kink resistant tubing.

BACKGROUND OF THE INVENTION

In many applications where kink resistant tubing is used, it may be desirable to provide collapsible (non-kink resistant) tubing portions for some specific purpose, such as controlling or intentionally stopping the flow of liquid through the tubing. Kink resistant tubing is frequently used in medical applications where the consequences of inadvertently kinking the tubing and shutting off the flow of a fluid, such as blood or an IV solution, may be harmful or fatal. In many medical applications, however, a portion of the tubing is deliberately constricted or kinked to control or shut off the flow of fluid through the lumen of the tubing.

An example of such a medical application is tubing connecting a patient's circulatory system to a heart bypass circuit, which may include one or more of the following elements: a rotary peristaltic blood pump or centrifugal blood pump, oxygenator, heat exchanger and bubble trap. Exposed tubing of this type would preferably be kink resistant to prevent inadvertent obstruction of the tubing, while the portion of the tubing that is placed in a rotary peristaltic pump, for example, should be collapsible.

Another example is catheter tubing. It may be desirable to have one or more portions of such a catheter formed with some type of relatively rigid kink resistant structure, with other portions being flexible. Other medical examples include IV tubing, which may include portions that should be collapsible. A portion of the tubing may be collapsible so that a roller clamp can be used to control or restrict the flow of fluid, or so that a linear peristaltic pump may be used to regulate the flow of fluid through the tubing.

U.S. Pat. No. 3,426,744 describes a heart pump cannula of elastic material having a non-reinforced expandable portion and a reinforced non-expandable portion. The non-expandable portion of the cannula may have a sleeve of rayon or nylon cord embedded therein to prevent expansion.

Numerous examples of non-medical applications of kink resistant tubing exist where it it desirable to provide collapsible portions for some purpose, if for no other reason than to reduce the cost of the tubing. It may be desirable to provide relatively short kink-resistant sections in long tubes, in locations (e.g., along bent portions) where kinking would otherwise be likely.

However, manufacturing tubing having reinforced and non-reinforced sections in large quantities has been difficult and expensive. Kink resistant tubing has typically been manufactured for medical use by first forming a plastic tube by coating a mandrel with a thermoplastic or thermoset material, such as silicone or plastisol. A coiled wire spring is then placed around the tube. The wire spring and tube would then be dipped or run through a molten thermoplastic solution to coat the wire and tube. The coating operation may be performed repeatedly until the desired surface properties and size are obtained, and each coating layer would be cured in an oven before applying the next layer. In order to facilitate removal of the completed tube from the mandrel, pressurized air has been supplied to the mandrel to separate the tube from the mandrel by forming a type of "air bearing". Even when using an air-bearing type mandrel, it has been difficult to form long continuous sections of tubing (e.g., Continuous sections greater than 16–18in. (400–460mm) long).

U.S. Pat. No. 3,618,613, for example, describes an antithrombotic intravascular catheter reinforced with nonkinking means. The tubing described in that patent is reinforced by the application of a continuous wire spring coiled around the tubing in an interference fit. The wire spring and tubing is then coated with a layer of silicone.

Alternative manufacturing techniques have included injection molding thermoplastic material into a mold holding a reinforcing wire insert. One problem with that technique is the tendency of the wire insert to move during molding, and the impracticality of forming long continuous sections of tubing in an injection mold.

Outside of the medical field, kink resistant or reinforced tubing has frequently been manufactured by wrapping wire reinforced tape around a moving cylindrical mandrel to form a hose. As shown in U.S. Pat. Nos. 2,516,864 and 2,688,343, the tape has sometimes included specially configured lateral edges to improve bonding between adjacent sections of tape. An alternative manufacturing method apparently described in U.S. Pat. Nos. 4,459,168 and 4,479,835 is to successively wind layers of tape and a reinforcing wire around a mandrel to form wire reinforced hose.

U.S. Pat. No. 4,350,547 describes a method of making flexible hose by among other things co-extruding a rigid resin reinforcement wire in a body of nitrile rubber to form a rubber strip. The rubber strip is wrapped around a former or mandrel to form flexible hose, and heat is applied to vulcanize the rubber portion of the hose.

One problem with the methods discussed above for manufacturing medical and non-medical grade tubing is that they are not designed to continuously form tubing having both reinforced and non-reinforced sections. Moreover, tubing formed by wrapping tape around a mandrel is believed to be unacceptable in medical applications where leaking and sterilization are special concerns. An additional problem is the need in medical applications for substantially clear tubing that does not have bubbles or defects in the tubing wall. Such bubbles would create false alarm, since they might be confused with air or gas in an IV solution or blood. The overlapped tape sections are believed to be difficult or impractical to manufacture without bonding defects or air bubbles. Any surface roughness along the seam between adjacent sections of tape may damage blood and irritate or damage body tissue, such as the walls of an artery or vein in which a tubular catheter or cannula is inserted. It is believed that the cumulative pressure drop caused by surface roughness along the seams of a long tube may be sufficient to substantially reduce the flow rate through the tube.

SUMMARY OF THE INVENTION

This invention provides apparatus and a method for producing flexible kink resistant tubing having one or more non-reinforced section(s) and one or more spirally-reinforced section(s). The apparatus and method permit the formation of reinforced and non-reinforced tubing sections on demand, manually or by automatic programming. Moreover, tubing is readily produced by the apparatus and method with smooth inner and outer surfaces and substantially without air bubbles or other defects in the wall of the tubing.

Generally, the apparatus of the invention comprises a body having inner surfaces defining a tube-forming passageway, and a generally cylindrical core in the tube-forming passageway along the central axis of the tube-forming passageway. The core has a mandrel portion adjacent one end of the core, around which an inner wall of the tubing may be formed. First extrusion means is provided for substantially continuously extruding a first thermoplastic material along the mandrel portion of the core, with an outer wall of the tubing being formed against the inner surfaces of the body, and rotatable extrusion means is provided for extruding a second thermoplastic material in a filament within the tube-forming passageway generally adjacent the mandrel portion of the core to form a reinforcing filament between the inner and outer walls of the tubing. The rotatable extrusion means is rotated around the core at a predetermined velocity by a drive means to form the reinforcing filament in a spiral or helical pattern in the wall of the tubing. And the second thermoplastic material is selectively provided to the rotatable extrusion means by a valve means so that filament reinforced and non-reinforced longitudinal sections of tubing may be formed.

In a second aspect of the invention, the core is rotatable, and third extrusion means is provided for extruding the first thermoplastic material along the inner surfaces of the body defining the tube-forming passageway. Drive means is then provided for rotating the core and first extrusion means at a predetermined velocity relative to the body and second and third extrusion means to form the reinforcing filament in a spiral or helical pattern in the wall of the tubing.

In the method of the invention, first and second extrusion means are first provided. The first extrusion means has a generally annular opening through which tubing may be formed with a central longitudinal axis along a central axis of the opening, and the second extrusion means is rotatable generally about the central axis of the first extrusion means. The second extrusion means has an extrusion passageway spaced from the central axis such that the passageway is positioned adjacent the annular opening of the first extrusion means throughout rotation around the central axis.

First and second thermoplastic materials are provided for extrusion through the first and second extrusion means, respectively, wherein the second thermoplastic material when solidified has a substantially greater stiffness than the first thermoplastic material when solidified. The first thermoplastic material is substantially continuously extruded through the annular opening to form the tubing wall, with the central longitudinal axis of the tubing substantially along the central axis of the opening. And the second thermoplastic material is selectively extruded, generally simultaneously with the extrusion of the first material, to form a reinforcing filament in predetermined sections of the wall of the tube by selectively providing the second thermoplastic material to the second extrusion means. The second extrusion means is rotated at a predetermined rotational velocity such that the reinforcing filament is formed in a helical or spiral pattern in the wall of the tubing about the central longitudinal axis of the tubing.

Other features will be pointed out hereinafter.

BRIEF DESCRIPTION OF THE DRAWING

The invention will be further described with reference to the drawing wherein corresponding reference characters indicate corresponding parts throughout the several views of the drawing, and wherein.

DETAILED DESCRIPTION OF PREFERRED EMBODIMENTS

Figure 1:
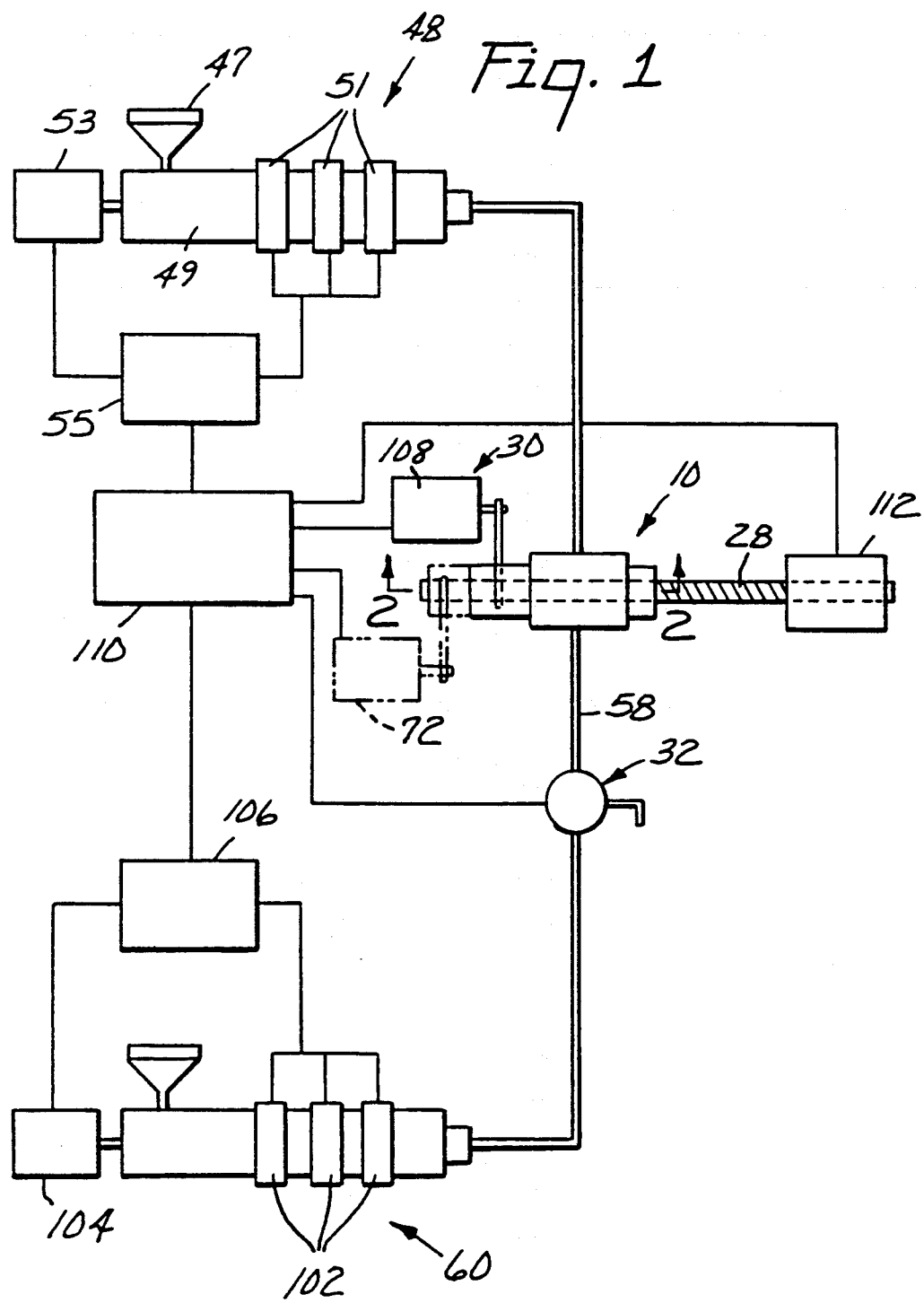
FIG. 1 is a diagrammatic view of the apparatus of the invention.

Apparatus of the invention is designated in its entirety by the reference characters 10, 10A, 10B and 10C in FIGS. 1-5, respectively. The apparatus 10, 10A, 10B and 10C is useful for producing flexible kink resistant tubing 12 (FIGS. 1 and 2) having one or more non-reinforced section(s) and one or more spirally-reinforced section(s). Such tubing is frequently need in medical applications, such as for various types of catheters, blood supply lines, and infusion or perfusion lines, although it should be appreciated that tubing produced in accordance with the invention may have many other uses, including non-medical applications.

Figure 2:
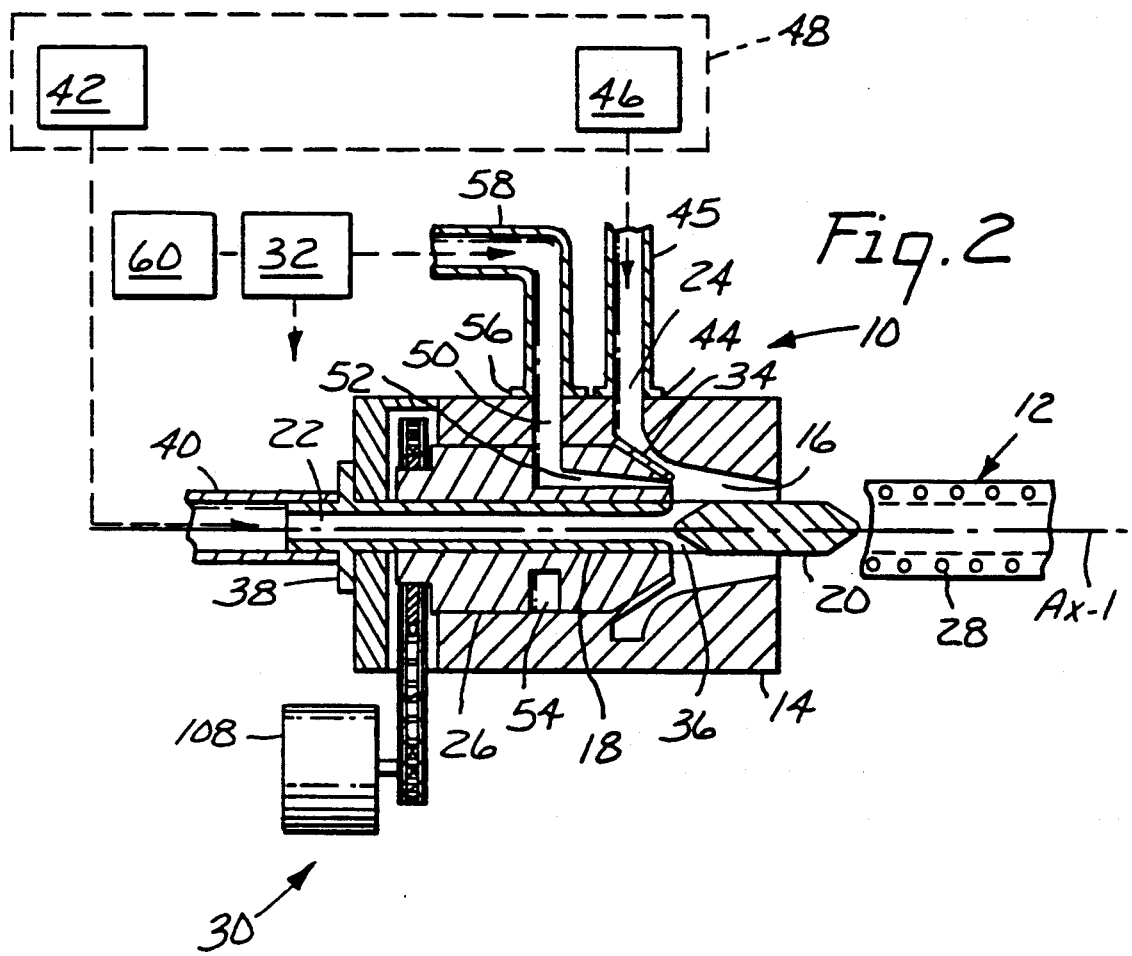
FIG. 2 is cross-sectional view substantially along line 2—2 of FIG. 1.

As shown in FIG. 2, the apparatus 10 generally comprises a body 14 having inner surfaces defining a tube-forming passageway 16, and a stationary, generally cylindrical core 18 in the tube-forming passageway 16 along the central axis AX-1 of the passageway 16. The core 18 has a mandrel portion 20 adjacent the downstream (rightwardly in the drawing) end of the core 18, around which an inner wall of the tubing 12 may be formed. As used herein, "downstream" and "upstream" refer to the overall direction of material flow through the tube-forming passageway 16, 16A and 16B. "Downstream" is the rightward direction in FIGS. 1-4, and "upstream" is the leftward direction in the figures.

First extrusion means (e.g., inner and outer extrusion passageways 22 and 24 in FIG. 2) is provided for substantially continuously extruding a first thermoplastic material along the mandrel portion 20 of the core 18, with an outer wall of the tubing 12 being formed against the inner surfaces of the body 14. And rotatable extrusion means, such as rotatable member 26, is provided for extruding a second thermoplastic material in a filament 28 within the tube-forming passageway 16 generally adjacent the mandrel portion 20 of the core 18 to form a reinforcing filament 28 between the inner and outer walls of the tubing.

The rotatable member 26 is rotated around the core 18 by suitable drive means 30 at a predetermined velocity relative to the body 14 to form the reinforcing filament 28 in a spiral or helical pattern in the wall of the tubing 12. A valve means 32 is provided for selectively providing the second thermoplastic material to the rotatable extrusion means 26 so that filament reinforced and non-reinforced longitudinal sections of tubing 12 may be formed. It should be noted that the first extrusion means and core 18 illustrated in FIG. 2 are maintained in a substantially stationary position with respect to the body 14.

As used herein, descriptions of motion and the word "stationary" refer to motion relative to something. For example, the description of the first extrusion means and core 18 as being "stationary" with respect to the body 14 includes the situation where the first extrusion means, core 18 and body 14 rotate in the same direction at the same velocity. And the rotatable member 26 being rotated relative to the core 18 is intended to include the situation where the core 18 is rotated inside the "rotatable" member 26.

Figure 3:
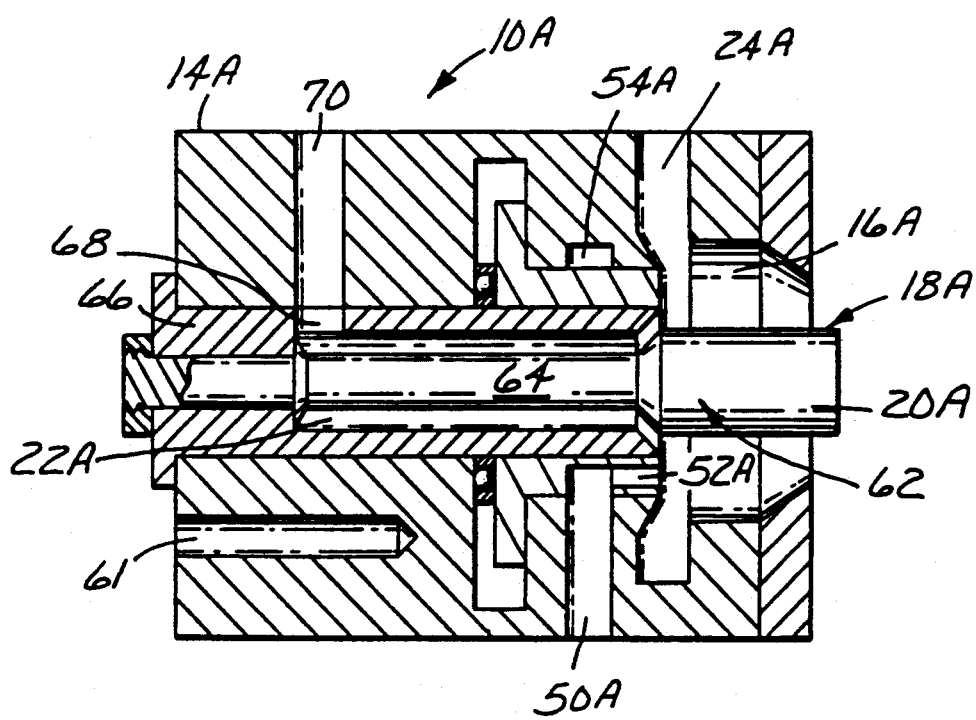
FIG. 3 is a cross-sectional view similar to FIG. 2, showing a second embodiment of apparatus of the invention.
Figure 4:
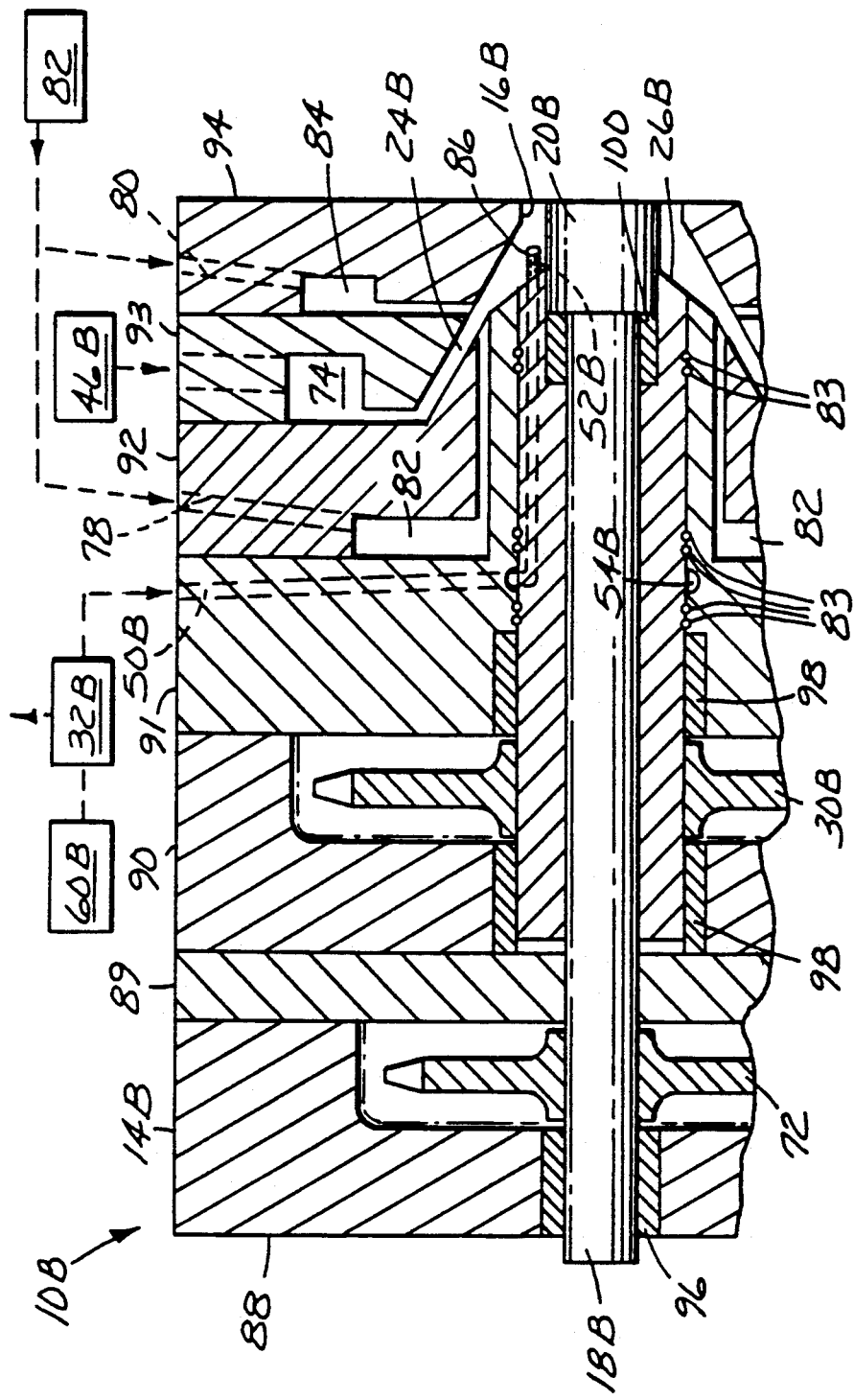
FIG. 4 is a cross-sectional view similar to FIGS. 2 and 3, showing a third embodiment of apparatus of the invention.

The inner surfaces of the body 14 preferably define the tube-forming passageway 16 as generally conical or frustoconical, with the tube-forming passageway 16 tapering toward a smaller diameter cross-section in the axial "downstream" direction away from the rotatable member 26 (i.e. in the rightward direction in the drawing). The body 14 also includes an isolating portion 34 adjacent the rotatable member 26. The isolating portion 34 defines at least a portion of the tube-forming passageway 16, and isolates the first thermoplastic material, which is not rotating in the tube-forming passageway 16, from the rotating member 26. The isolating portion 34 may be generally annular, with a generally frustoconical inner surface slidably engaging a frustoconical or tapered end portion of the rotatable member 26, and a generally frustoconical outer surface defining a portion of the upstream end of the tube-forming passageway. A specific isolating portion 34 is not required when the rotatable member 26A and 26B is adequately isolated from the tube-forming passageway 16A and 16B, as illustrated in FIGS. 3 and 4.

Preferably, the inner extrusion passageway 22 (FIG. 2) is defined by walls of the stationary core 18 as opening through a circumferential outer surface of the core 18 generally adjacent the mandrel portion 20. More specifically, the walls of the stationary core 18 conveniently define the inner extrusion passageway 22 as extending generally coaxially inside the core 18 from the rightward or "upstream" end opposite the mandrel portion 20 toward the mandrel portion 20, and as having at least one radially-outwardly directed opening 36 adjacent the mandrel portion 20. The inner extrusion passageway 22 most preferably has a generally annular configuration along the opening into the tube-forming passageway 16, with relatively thin radially-oriented fins extending between the mandrel portion 20 and the upstream portion of the core 18.

The outer extrusion passageway 24 opens through the body 14 into the tube-forming passageway 16 generally adjacent the downstream end of the rotatable member 26. The outer extrusion passageway 24 has a generally annular configuration adjacent the tube-forming passageway 16 so that material is uniformly supplied along the "die" surfaces defining the tube-forming passageway 16.

The stationary core 18 includes first-mounting means, such as tube fitting 38, for mounting a first supply line 40 on the core 18 to supply the first thermoplastic material from material supply 42 to the inner extrusion passageway 22, and the body 14 includes second-mounting means, such as fitting 44, for mounting a second supply line 45 on the body 14 to supply the first thermoplastic material from material supply 46 to the outer extrusion passageway 24. As indicated by the box 48 shown in phantom enclosing material supplies 42 and 46, the source of material for the inner and outer extrusion passageways 22 and 24 may conveniently take the form of a single material supply 48, since it is contemplated that the same material will be supplied to the inner and outer passageways. In some circumstances, however, it may be desirable to provide different materials to the inner and outer extrusion passageways 22 and 24. For example, it may be desirable to provide different materials that would be compatible with different environments.

Material supplies 42, 46 and/or 48 may be in the form of a conventional barrel-enclosed, rotating feed screw (now shown), and a conventional feed hopper 47 (FIG. 1) for feeding solid plastic pellets or the like to the feed screw. In this type of supply, the barrel 49 is heated by heaters 51, and the pellets are melted by this heat and friction as the screw is turned by a motor 53 to force the material into and through the extrusion die. The motor 53 and heaters 51 may be controlled by an electronic extruder controller 55. Extruders of the type indicated at 49 in FIG. 1 are sold by Killion Extruders, Inc., of Cedar Grove, New Jersey, and C.W. Brabender Instruments, Inc., of Hackensack, New Jersey. Suitable "first thermoplastic" materials include polyurethane, silicone, various coalloys of urethane and polyvinyl chloride.

The body 14 and rotatable member 26 preferably include walls defining cooperable extrusion passageways 50 and 52 in substantially continuous communication via an annular channel 54 as the rotatable member 26 rotates, with the extrusion passageway 50 of the body 14 extending generally transversely (upwardly and downwardly in the drawing), and the extrusion passageway 52 of the rotatable member 26 extending generally logitudinally (horizontally in the drawing) of the rotatable member 26. The annular channel 54 is formed by walls of the member 26 along an interface between the body 14 and rotatable member 26 to ensure substantially continuous communication between the cooperable extrusion passageways 50 and 52. Alternatively, the annular channel 54A or 54B (FIGS. 3–4) may be formed in the body 14 without departing from the scope of the invention.

Third-mounting means 56 (FIG. 2) is provided for mounting a third supply line 58 on the body 14 to supply the second thermoplastic material from second material supply 60 to the cooperable extrusion passageways 50 and 52. Suitable "second thermoplastic materials" have a substantially greater stiffness when solidified than the first thermoplastic material, and include among other things nylon, polypropylene, "rigid", i.e., non-plastized polyvinyl chloride, acetyl, polyethylene and polycarbonate. Material supply 60 may be similar in design to material supplies 42, 46 and/or 48, but may not be combined with the other material supplies, since a stiffer material is required for the reinforcing filament than for the tubing wall. Material supply 60 includes a heated barrel 102, in which a feed screw (not shown) is rotated to force the molten second thermoplastic material through the third supply line 58. The barrel heaters (also at 102) and a drive motor 104 are controlled by an electronic extruder controller 106.

The valve means 32 conveniently is a "diverter" valve 32, which will divert the second thermoplastic material from the third supply line 58 and cooperable passageways 50 and 52 in order to prevent excessive back pressure from being created when the second material is not being provided to the tube-forming passageway 16. Depending on the type of tubing being produced, the material "dumped" by the diverter valve 32 may be reused.

The drive means 30 is preferably adapted for rotating the rotatable member 26 around the core 18 at a predetermined velocity relative to the rate of extrusion of the first thermoplastic material. For example, the drive means 30 may include a conventional chain-and-sprocket drive system and an electric motor 108, as illustrated in FIG. 1.

The electric motor 108 would be controlled via any suitable control circuitry to drive the rotatable member 26 at the desired velocity. Such circuitry may include a sensor (not shown) for determining the rate of flow of the first and/or second thermoplastic materials, or may be electrically coupled with the feed screws of the material supplies 42, 46, 48, and/or 60 by any suitable means, such as the central process controller designated 110 in FIG. 1. The central controller 110 communicates with the diverter valve 32, and may be programmed to provide a control signal to the diverter valve 32 so that specific lengths of reinforced and non-reinforced sections of tubing may be produced.

FIG. 3 illustrates a second embodiment of the apparatus 10A wherein the body 14A includes heating means 61 for heating the first and second thermoplastic materials during extrusion thereof. For example, the heating means 61 may include a conventional electric heating element (not shown) and walls of the body 14A defining a generally cylindrical bore 61 for receiving the heating element.

The core 18A comprises two elements, as opposed to the unitary construction of the core 18 shown in FIG. 2. The first "inner" element 62 is generally cylindrical, and includes the mandrel portion 20A, and an inner portion 64 that forms an inner surface of an annular inner extrusion passageway 22A. The second "outer" element 66 is generally cylindrical, with a longitudinal axis generally coaxial with the longitudinal axis of the inner element 62. The outer element 66 includes walls forming a bore or inner extrusion passageway 22A extending longitudinally "upstream" from the "downstream" end of the outer element 66. The outer element 66 has an opening 68 extending radially or transversely outwardly from the bore 22A in fluid communication with an extrusion passageway 70 that supplies the inner passageway 22A with material.

FIG. 4 illustrates a third embodiment of the apparatus 10B of the invention wherein the core 18B is mounted in the body 14B for rotation about the central axis of the tube-forming passageway 16B in the direction counter or opposite to the direction of rotation of the rotatable member 26B. This counter rotation is believed to lead to more stable formation of tubing in some circumstances, since it counteracts the disruption that otherwise may be caused by the introduction of the rotating filament material. A second drive means 72 similar to drive means 30 or 30B may be provided for rotating the core 18B, or alternatively the second drive means 72 may be coupled by suitable gearing to the first drive means 30B to ensure the appropriate rotational velocity (e.g., 0–500rpm in the counterclockwise direction when the rotatable member 26B is rotating at 0–500rpm in the clockwise direction). Alternatively, the second drive means 72 may be used to rotate the core 18B in the same direction as the rotatable member 26B is rotating.

The first extrusion passageway 24B of the apparatus 10B is provided with an enlarged annular plenum chamber 74 to ensure a steady uniform supply of the first thermoplastic material to the annular portion of the first extrusion passageway 24B, which is "downstream" of the plenum chamber 74. A lubrication means is preferably employed to provide lubrication along the inner surfaces of the body 14B that define the tube-forming passageway 16B to facilitate forming smooth tubing walls and to prevent rolling of the first thermoplastic material in the passageways. For example, two lubrication passageways 78 and 80 may be formed in the body 14B to provide a lubricant from a source 82. The lubrication passageways 78 and 80 include enlarged plenum chambers 82 and 84 to ensure uniform application of lubricant from an annular portion of the lubrication passageways 78 and 80 downstream of the plenum chambers.

The rotatable member 26B preferably includes a tubular portion 86 defining the cooperable extrusion passageway 52B. The tubular portion 86 extends longitudinally downstream from the downstream (rightward in FIG. 4) end of the rotatable member 26B into the tube-forming passageway 16B. Suitable 0-ring seals 83 may be provided between the rotatable member 26B and the body 14B to seal around the annular channel 54B and to seal the rotatable member 26B adjacent the tube-forming passageway 16B if very high back pressure is being developed in the extrusion passageways. Suitable 0-ring seals may be formed of rubber, bronze, steel, ceramic or other materials depending on the operating temperature and materials being extruded.

The body 14B may be assembled from a number of separate plate steel components each having an appropriate configuration to form the passageways, plenum chambers, and other features discussed above. Each such configuration in this design may readily be machined into the plate steel components 88–94 illustrated in FIG. 4. Bushings 96, 98 and 100 (e.g., of bronze) may be provided at suitable points between the rotatable member 26B, core 18B and body 14B if similar materials are used for the rotatable member, core and body. Alternatively, the bushings 96, 98 and 100 may be omitted (see, e.g., FIG. 2) if the rotatable member 26 is formed of bronze, and the core 18 and body 14 are formed of steel. It will be understood that other materials may be suitable for the body 14B, such as aluminum or bronze.

Figure 5:
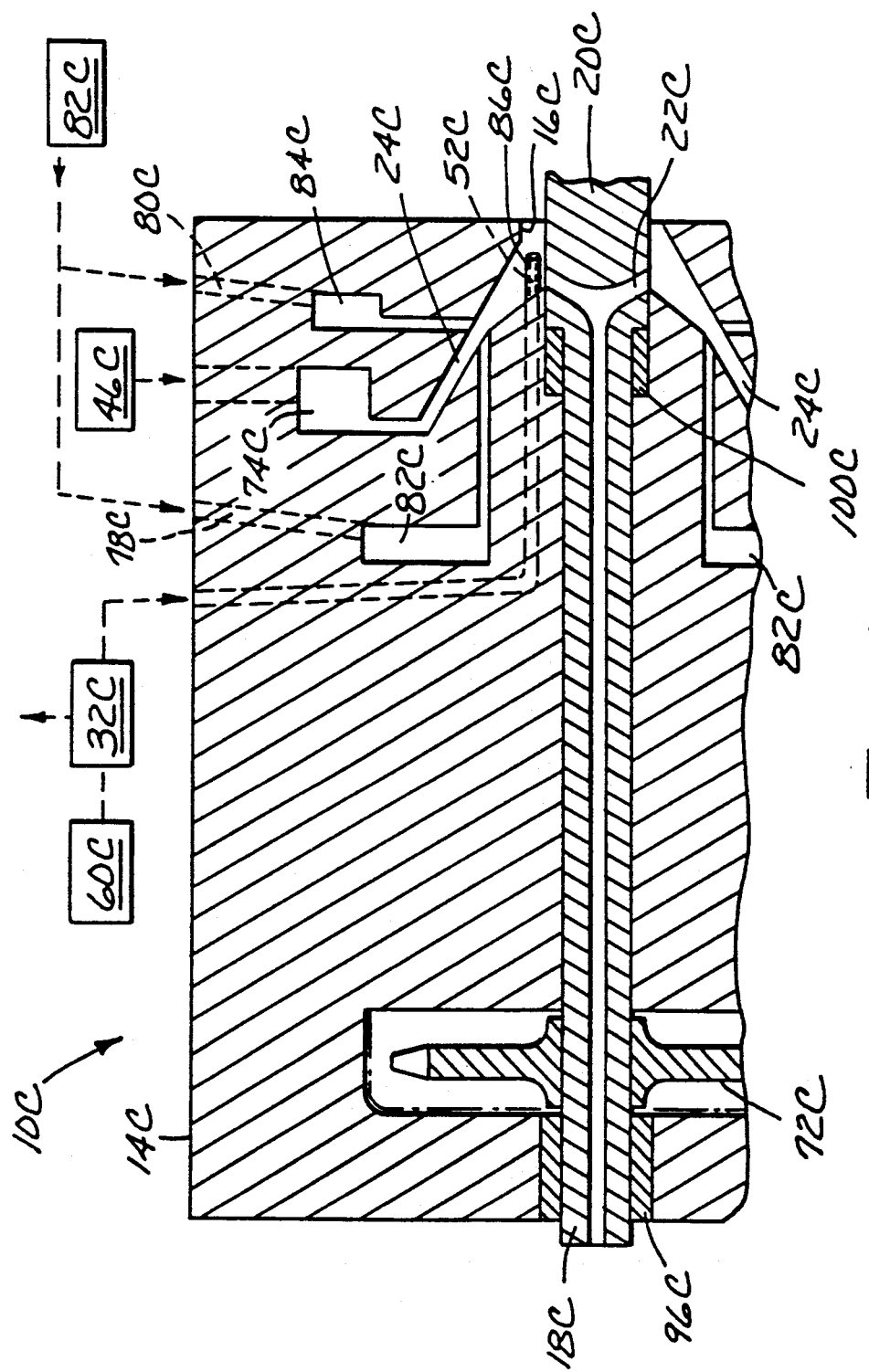
FIG. 5 is a cross-sectional view similar to FIGS. 2-4, showing a forth embodiment of apparatus of the invention. Reference numerals ending with an "A" in FIG. 3, reference numerals ending with a "B" in FIG. 4, and reference numerals ending with a "C" in FIG. 5 indicate similar parts to those designated by the same reference numeral.

FIG. 5 illustrates yet another alternative embodiment of the apparatus 10C of the invention wherein a rotatable core 18C is rotated relative to the body 14C, and the second extrusion means 52C (i.e., the filament extrusion means) is stationary relative to the body 14C. The core 18C includes walls defining a first extrusion means (e.g., inner extrusion passageway 22C) similar to the inner extrusion passageways 22 and 22A for extruding the 5 first thermoplastic material along the mandrel portion 20C of the core 18C. The body 14C includes walls defining a second extrusion means (e.g., passageway 52C) for extruding the second thermoplastic material to form a reinforcing filament, and a third extrusion means (e.g., outer passageway 24C) for extruding the first thermoplastic material along the inner surfaces defining the tube-forming passageway 16C.

In this embodiment, the second and third extrusion means 52C and 24C are held stationary relative to one another, and the first extrusion means or passageway 22C is rotated relative to the body 14C during extrusion. As a result, the filament and outer wall portion of tubing formed according to this embodiment are not rotating relative to one another during extrusion. The spiraling effect of the filament is produced by the rotation of the core 18C and inner extrusion passageway 22C, which form the inner wall portion of the tubing.

In operation, the first thermoplastic material is substantially continuously extruded through the annular opening or passageway 16, 16A, 16B, 16C (see, e.g., FIGS. 2-5) from the first extrusion passageway(s) 22 and 24, 22A and 24A, or 22B to form the tubing wall, with the central longitudinal axis of the tubing substantially along the central axis of the tube-forming passageway 16, 16A, 16B. The second thermoplastic material is selectively extruded, generally simultaneously with the extrusion of the first material, to form a reinforcing filament in predetermined sections of the wall of the tube by selectively providing the second thermoplastic material to the cooperable extrusion passageways 50 and 52, 50A and 50B, or 50B and 52B.

Since the rotatable member 26, 26A or 26B is rotated at a predetermined rotational velocity, the reinforcing filament is formed in a helical or spiral pattern in the wall of the tubing about the central longitudinal axis of the tubing. The supply of the second thermoplastic material may be controlled through the diverter valve 32, 32A or 32B manually or by any suitable conventional automatic programmed controller 110. In the apparatus shown in FIG. 4, the core 18B may be rotated in the direction opposite to the direction of rotation of the rotatable member 16B.

Desired lengths of tubing may be cut by a cutter 112 (FIG. 1) that is positioned longitudinally downstream (leftwardly in FIG. 1) of the apparatus 10. The cutter 112 may be electronically controlled by the central process controller 110.

As various changes could be made in the constructions described above without departing from the scope of the invention, it is intended that all matter contained in the above description or shown in the drawing be interpreted as illustrative and not in a limiting sense.

I claim:

1. Apparatus for producing flexible kink resistant tubing adapted for medical purposes, the tubing having one or more non-reinforced section and one or more spirally-reinforced section with the non-reinforced section being adapted to be resiliently crushed to regulate fluid flow through the tubing, the apparatus comprising:

a body having inner surfaces defining a tube-forming passageway, the tube-forming passageway having a central axis;

a generally cylindrical core in the tube-forming passageway along the central axis thereof, the core having a mandrel portion adjacent one end of the core, around which an inner wall of the tubing may be formed;

first extrusion means for substantially continuously extruding a first medical grade thermoplastic material along the mandrel portion of the core, with an outer wall of the tubing being formed against the inner surfaces of the body;

rotatable extrusion means for extruding a second thermoplastic material in a filament within the tube-forming passageway generally adjacent the mandrel portion of the core to form a reinforcing filament between the inner and outer walls of the tubing;

drive means for rotating the rotatable extrusion means around the core at a predetermined velocity relative to the body to form the reinforcing filament in a spiral or helical pattern in the wall of the tubing; and valve means for selectively providing the second thermoplastic material to the rotatable extrusion means so that filament reinforced and non-reinforced longitudinal sections of tubing may be formed.

2. Apparatus according to claim 1 wherein the first extrusion means and core are maintained in a substantially stationary position with respect to the body.

3. Apparatus according to claim 2 wherein the first extrusion means comprises walls of the core defining an inner extrusion passageway opening through a circumferential surface of the core generally adjacent the mandrel portion thereof, and walls of the body defining an outer extrusion passageway opening through the body into the tube-forming passageway generally adjacent the rotatable extrusion means.

4. Apparatus according to claim 3 wherein the inner surfaces of the body define the tube-forming passageway as generally conical or frustoconical, with the tube-forming passageway tapering toward a smaller diameter cross-section in the axial direction away from the rotatable extrusion means.

5. Apparatus according to claim 3 wherein the walls of the stationary core define the inner extrusion passageway as extending generally coaxially inside the core from the end opposite the mandrel portion toward the mandrel portion, and as having at least one radially-outwardly directed opening adjacent the mandrel portion.

6. Apparatus according to claim 3 wherein the rotatable extrusion means comprises a rotatable member adjacent and rotatable about the stationary core, the rotatable member and body including walls defining cooperable extrusion passageways in substantially continuous communication as the rotatable member rotates.

7. Apparatus according to claim 6 wherein the walls defining cooperable extrusion passageways include walls defining an annular channel along an interface between the body and rotatable member for ensuring substantially continuous communication between the cooperable extrusion passageways of the body and the rotatable member.

8. Apparatus according to claim 7 wherein the body includes a portion adjacent the rotatable member defining at least a portion of the tube-forming passageway and isolating the first thermoplastic material from the rotatable member.

9. Apparatus according to claim 1 wherein the rotatable extrusion means comprises a rotatable member adjacent and rotatable about the core, the rotatable member and body including walls defining cooperable extrusion passageways and an annular channel along an interface between the body and rotatable member for ensuring substantially continuous communication between the cooperable extrusion passageways of the body and the rotatable member as the rotatable member rotates.

10. Apparatus according to claim 9 wherein the first extrusion means comprises walls of the body defining an outer extrusion passageway opening through the body into the tube-forming passageway generally adjacent the rotatable extrusion means, the core being mounted in the body for rotation about the central axis of the tube-forming passageway in the direction opposite to the direction of rotation of the rotatable member.

11. Apparatus according to claim 10 wherein the first extrusion means further comprises walls of the core defining an inner extrusion passageway opening through a circumferential surface of the core generally adjacent the mandrel portion thereof, the walls of the core defining the inner extrusion passageway as extending generally coaxially inside the core from the end opposite the mandrel portion toward the mandrel portion, and as having at least one radially-outwardly directed opening adjacent the mandrel portion.

12. Apparatus according to claim 9 wherein the drive means includes mean for rotating the rotatable member around the core at a predetermined velocity relative to the rate of extrusion of the first thermoplastic material.

13. Apparatus according to claim 9 wherein the body includes a portion adjacent the rotatable member defining at least a portion of the tube-forming passageway and isolating the first thermoplastic material from the rotatable member.

14. Apparatus according to claim 1 further comprises heating means in the body for heating the first and second thermoplastic materials during extrusion thereof.

15. Apparatus according to claim 1 wherein the valve means comprises a diverter valve for diverting the second thermoplastic material from the rotatable extrusion means in order to prevent excessive back pressure being created when material is not being provided to the rotatable extrusion means.

16. Apparatus for producing flexible kink resistant tubing adapted for medical purposes, the tubing having one or more non-reinforced section and one or more spirally-reinforced section with the non-reinforced section(s) being adapted to be resiliently crushed to regulate fluid flow through the tubing, the apparatus comprising:

a body having inner surfaces defining a tube-forming passageway, the tube-forming passageway having a central axis;

a generally cylindrical rotatable core in the tube-forming passageway along the central axis thereof, the core having a mandrel portion adjacent one end of the core, around which an inner wall of the tubing may be formed;

first extrusion means for substantially continuously extruding a first medical grade thermoplastic material along the mandrel portion of the core;

second extrusion means for extruding a second thermoplastic material in a filament within the tube-forming passageway generally adjacent the mandrel portion of the core to form a reinforcing filament between the inner and outer walls of the tubing;

third extrusion means for extruding the first thermoplastic material along the inner surfaces of the body defining the tube-forming passageway;

drive means for rotating the core and first extrusion means at a predetermined velocity relative to the body and second and third extrusion means to form the reinforcing filament in a spiral or helical pattern in the wall of the tubing; and valve means for selectively providing the second thermoplastic material to the second extrusion means so that filament reinforced and non-reinforced longitudinal sections of tubing may be formed.

17. Apparatus according to claim 16 wherein the second and third extrusion means are maintained in a substantially stationary position with respect to the body.

18. Apparatus according to claim 17 wherein the inner surfaces of the body define the tube-forming passageway as generally conical or frustoconical, with the tube-forming passageway tapering toward a smaller diameter cross-section in the axial direction away from the rotatable extrusion means.

19. Apparatus according to claim 17 wherein the first extrusion means comprises walls of the rotatable core defining an inner extrusion passageway as extending generally coaxially inside the core from the end opposite the mandrel portion toward the mandrel portion, and as having at least one radially-outwardly directed opening adjacent the mandrel portion.

20. Apparatus according to claim 19 wherein the drive means includes means for rotating the core at a predetermined velocity relative to the rate of extrusion of the second thermoplastic material.

21. Apparatus according to claim 16 further comprises heating means in the body for heating the first and second thermoplastic materials during extrusion thereof.

22. Apparatus according to claim 16 wherein the valve means comprises a diverter valve for diverting the second thermoplastic material from the second extrusion means in order to prevent excessive back pressure being created when material is not being provided to the second extrusion means.

23. A method of producing flexible kink resistant tubing adapted for medical purposes, the tubing having a tubing wall with one or more non-reinforced section(s) and one or more spirally-reinforced section(s) with the non-reinforced section(s) being adapted to be resiliently crushed to regulate fluid flow through the tubing; the method comprising the steps of:

providing a first extrusion means having a generally annular opening through which tubing may be formed with a central longitudinal axis along a central axis of the opening;

providing a second extrusion means rotatable generally about the central axis of the first extrusion means and having an extrusion passageway spaced from the central axis such that the passageway is positioned adjacent the annular opening of the first extrusion means throughout rotation around the central axis;

providing first and second medical grade thermoplastic materials for extrusion through the first and second extrusion means, respectively, wherein the second thermoplastic material when solidified has a substantially greater stiffness than the first thermoplastic material when solidified;

substantially continuously extruding the first thermoplastic material through the annular opening to form the tubing wall, with the central longitudinal axis of the tubing substantially along the central axis of the opening;

selectively extruding the second thermoplastic material, generally simultaneously with the extrusion of the first material, to form a reinforcing filament in predetermined sections of the wall of the tube by selectively providing the second thermoplastic material to the second extrusion means; and rotating the second extrusion means at a predetermined rotational velocity relative to the body such that the reinforcing filament is formed in a helical or spiral pattern in the wall of the tubing about the central longitudinal axis of the tubing.

24. A method according to claim 23 wherein the step of rotating the second extrusion means comprises rotating the second extrusion means at a predetermined rotational velocity relative to the rate of extrusion of the first material.

25. A method according to claim 23 wherein a valve is operatively associated with the second extrusion means to control the supply of the second thermoplastic material to the second extrusion means, the step of selectively extruding the second thermoplastic material including the steps of:

selectively opening the valve to supply the second thermoplastic material to the second extrusion means to form a reinforced section of tubing; and selectively closing the valve to prevent the second thermoplastic material from being supplied to the second extrusion means to form a non-reinforced section of tubing.

26. A method according to claim 25 wherein the step of selectively closing the valve includes the step of diverting the second thermoplastic material to prevent excessive back pressure from developing when the valve is closed.

27. A method according to claim 23 further comprising the step of heating the first and second thermoplastic materials during extrusion thereof.

* * * * *